(12) United States Patent
Kilby et al.

(10) Patent No.: US 10,912,244 B2
(45) Date of Patent: Feb. 9, 2021

(54) ENHANCED RESOLUTION FORE/AFT LEVELING OF A TOWABLE TILLAGE IMPLEMENT

(71) Applicant: CNH Industrial America LLC, New Holland, PA (US)

(72) Inventors: Christian Kilby, Mackinaw, IL (US); Michael G. Kovach, Morton, IL (US); Michael Glennon, Normal, IL (US)

(73) Assignee: CNH Industrial America LLC, New Holland, PA (US)

( * ) Notice: Subject to any disclaimer, the term of this patent is extended or adjusted under 35 U.S.C. 154(b) by 250 days.

(21) Appl. No.: 15/999,216

(22) Filed: Aug. 16, 2018

(65) Prior Publication Data

US 2020/0053942 A1    Feb. 20, 2020

(51) Int. Cl.
*A01B 63/111* (2006.01)
*A01B 59/00* (2006.01)
*A01B 5/04* (2006.01)

(52) U.S. Cl.
CPC .............. *A01B 63/111* (2013.01); *A01B 5/04* (2013.01); *A01B 59/002* (2013.01); *A01B 59/004* (2013.01)

(58) Field of Classification Search
CPC .......................... A01B 59/004; A01B 63/111
USPC ................................................ 172/4, 7, 239
See application file for complete search history.

(56) References Cited

U.S. PATENT DOCUMENTS

| | | | |
|---|---|---|---|
| 3,233,682 A * | 2/1966 | Thompson | A01B 63/14 172/7 |
| 3,762,480 A | 10/1973 | Hofer | |
| 4,655,296 A | 4/1987 | Bourgault et al. | |
| 5,653,292 A * | 8/1997 | Ptacek | A01B 63/114 172/239 |
| 6,035,943 A | 3/2000 | Gerein et al. | |
| 6,076,611 A | 6/2000 | Rozendaal et al. | |

(Continued)

FOREIGN PATENT DOCUMENTS

WO    2015/144130 A1    10/2015

OTHER PUBLICATIONS

Dave Mowitz, Tillage Attack Plan, Successful Farming, Mar. 4, 2013, Meredith Corporation, https://www.agriculture.com/machinery/farm-implements/tillage-equipment/tillage-attack-pl_227-ar30234.

*Primary Examiner* — Gary S Hartmann
(74) *Attorney, Agent, or Firm* — Rebecca L. Henkel; Rickard K. De Mille (57) ABSTRACT

A system, apparatus and method, for enhancing resolution during remotely controlled adjustment of a fore/aft trim angle of a frame of a towable tillage implement, utilize a fore/aft trim angle adjustment arrangement operatively attached between a hitch and the frame of the implement for tilting the frame at a desired trim angle along a fore/aft axis of the frame. An adjustable-length fore/aft trim linkage is operatively connected between the frame and the hitch for adjusting and maintaining the trim angle. A linear actuator is operatively attached to the trim angle linkage for remotely controlling the length of the trim angle adjustment linkage to thereby adjust the trim angle as a function of a stroke of the actuator. The fore/aft trim linkage provides an adjustment in its length that is proportionally less than the stroke of the actuator, to thereby provide enhanced resolution for remote control of the trim angle.

17 Claims, 4 Drawing Sheets

(56) References Cited

U.S. PATENT DOCUMENTS

| | | | | |
|---|---|---|---|---|
| 6,397,953 | B1* | 6/2002 | Ankenman | A01B 51/04 |
| | | | | 172/445.1 |
| 9,301,439 | B2 | 4/2016 | Gilstring | |
| 9,370,137 | B2 | 6/2016 | Hennes | |
| 9,497,897 | B2* | 11/2016 | Hennes | A01B 21/083 |
| 9,615,499 | B2 | 4/2017 | Kowalchuk et al. | |
| 9,839,173 | B2 | 12/2017 | Henry | |
| 2013/0068489 | A1* | 3/2013 | Blunier | A01B 63/22 |
| | | | | 172/239 |
| 2020/0045868 | A1* | 2/2020 | Wu | A01B 63/111 |
| 2020/0060062 | A1* | 2/2020 | Sporrer | A01B 63/22 |
| 2020/0068777 | A1* | 3/2020 | Barrick | A01B 76/00 |

* cited by examiner

ENHANCED RESOLUTION FORE/AFT LEVELING OF A TOWABLE TILLAGE IMPLEMENT

FIELD OF THE INVENTION

The present invention pertains to a towable agricultural tillage implement and, more specifically, to enhancing resolution in fore/aft trim leveling, and adjustments to the fore/aft leveling of such an implement, to thereby facilitate operation of the towable tillage implement and provide improved seedbed conditions.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions including a uniform controlled depth, a flat and smooth floor at the bottom of the seedbed, and a relatively even surface finish.

To achieve these desired seedbed conditions, a number of factors must be taken into account in the design and set-up of a tillage implement so that it will operate properly with a given towing vehicle operating at a desired speed. One critical factor affecting operation of the implement and for achieving an optimal seedbed is the fore/aft trim of the implement.

Fore/aft trim refers to how closely the frame of an implement carrying one or more tillage tools, such as disk coulters, ripper points, etc., is oriented parallel with the surface of the ground being traversed by the tillage implement. Fore/aft trim is also sometimes called fore/aft pitch, or fore/aft levelness. Some types of tillage equipment, such as rippers, work best when the frame is essentially oriented parallel to the surface of the ground. Other types of tillage tools, such as disks, may work best when the front of the frame is tilted slightly downward. Variations in soil conditions, and differences in machinery may require adjustments in the fore/aft trim to achieve desired results that deviate slightly from a theoretical optimum trim angle.

Variances from theoretically optimal trim angles may also be necessary in combination implements, such as an implement having a common frame carrying a disk unit ahead of a ripper unit followed by a disk, and then by a reel-type finishing unit, for example. In such combination implements, optimal performance of the implement may require setting the trim angle at a value that is a compromise between what would be optimal if the frame were carrying only one type of tillage tool.

Historically, the fore/aft trim angle was set during initial set-up of the implement, using manually adjustable turnbuckles, for example, with the implement sitting on a flat surface such as a shop floor or equipment lot. Once in the field, these initial adjustments were fine-tuned with the tillage tools engaging the soil, by the operator having to stop and exit the towing vehicle and then manually adjusting the turnbuckles while the implement remained hitched to the towing vehicle.

In more recent times, remotely controllable actuators such as hydraulic cylinders have been used in place of manually-operable turnbuckles, so that adjustments to the fore/aft trim angle could be made in accordance with manual inputs from an operator located in the cab of the towing vehicle, or by an automatic control system.

Although fore/aft trim angle adjustment systems having remotely controllable actuators offer considerable advantage over systems having only manual adjustments, further improvement in such systems is desirable.

For example, it has been observed that present approaches to providing for remote adjustment of fore/aft trim angle may not provide sufficient resolution in controlling the trim angle to take full advantage of the degree of precision to which modern tillage equipment can otherwise be adjusted and operated. Operating a tillage implement in a less than optimal manner can lead to poor seedbed preparation that adversely affects plant germination and yield. Operation in a non-optimal manner may also result in increased operational costs in time and fuel that must be expended in preparing the seedbed, and getting the crop planted.

It is therefore desirable to provide an improved system, apparatus and method for setting and maintaining fore/aft trim angle in a tillage implement that will allow full utilization of the degree of precision to which modern tillage equipment can otherwise be adjusted and operated, to thereby provide an optimum seedbed, and efficient and effective operation of tillage implements and towing vehicles. It is specifically desirable to provide enhanced resolution of trim angle adjustment capability in remotely and/or automatically adjustable fore/aft trim adjustment systems, apparatuses and methods.

SUMMARY OF THE INVENTION

The invention provides a system, apparatus and method for enhancing resolution during remotely controlled adjustment of a fore/aft trim angle of a frame of a towable tillage implement. Various forms of the invention utilize a fore/aft trim angle adjustment arrangement operatively attached between a hitch and the frame of the implement for tilting the frame at a desired trim angle along a fore/aft axis of the frame. An adjustable-length fore/aft trim linkage is operatively connected between the frame and the hitch for adjusting and maintaining the trim angle. A linear actuator is operatively attached to the trim angle linkage for remotely controlling the length of the trim angle adjustment linkage to thereby adjust the trim angle as a function of a stroke of the actuator. The fore/aft trim linkage is configured to provide an adjustment in its length that is proportionally less than the stroke of the actuator, to thereby enhance resolution during remote control of the fore/aft trim angle of the frame.

In one form of the invention, a system is provided for adjusting fore/aft trim in a towed implement that includes a frame, ground support wheels, and a hitch. The frame defines forward and aft ends, and a fore/aft axis of the frame. The frame is adapted for carrying one or more tillage tools. The ground support wheels are operatively attached to the frame by a depth adjustment arrangement that includes a depth adjustment actuator for adjusting a depth of penetration of at least one of the one or more tillage tools below a ground surface. The hitch has an aft end that is pivotably attached to the forward end of the frame. The hitch also has a distal end that is adapted for attachment, at a drawbar height, to a towing vehicle. The aft end of the hitch is pivotably attached to the frame in a manner that allows the frame to be pivoted through a pivot angle with respect to the hitch, for tilting the frame along the fore/aft axis to thereby adjust fore/aft trim of the frame.

A fore/aft trim adjustment system, according to the invention, may include a fore/aft trim angle adjustment arrangement operatively attached between the hitch and the frame for tilting the frame at a trim angle along the fore/aft axis. The fore/aft trim angle adjustment arrangement may have an adjustable-length fore/aft trim linkage operatively connected between the frame and the hitch for adjusting and maintaining the trim angle. The fore/aft trim angle adjustment arrangement may also include a remotely controllable fore/aft trim angle adjustment actuator that has a stroke and is operatively attached to the fore/aft trim angle adjustment linkage for remotely controlling the length of the fore/aft trim angle adjustment linkage to thereby adjust the trim angle. The fore/aft trim linkage may be configured to provide an adjustment in length that is proportionally less than the stroke of the fore/aft trim angle adjustment actuator, to thereby provide enhanced resolution for remotely controlled adjustment of the trim angle by the fore/aft trim adjustment system.

In some forms of the invention, the fore/aft trim angle adjustment actuator is a linear actuator having first and second ends separated by an adjustable length of the linear actuator, and the fore/aft trim adjustment arrangement may include a resolution adjusting link and a positioning link. The resolution adjusting link may have a proximal end defining a first attachment point pivotably attached to the hitch for motion in the fore/aft direction, a distal end pivotably attached to the first end of the linear actuator, and an intermediate attachment point disposed between the proximal and distal ends that is pivotably attached to a first end of the positioning link. The positioning link may further have a second end that is pivotably attached to the frame, and a mounting lug for pivotable attachment of the second end of the linear actuator in a manner that provides pivoting motion of the fore/aft resolution adjusting link and the positioning link generally in the fore/aft direction under extension and retraction of the length of the linear actuator.

Some forms of a fore/aft trim adjustment system, according to the invention, may also include a trim angle adjustment power source operatively connected to the trim angle adjustment actuator, a trim angle position sensor arrangement, a depth sensor arrangement, and a control unit. The trim angle position sensor arrangement may be operatively attached between the hitch and the frame for detecting a present value of the pivot angle between the frame and the hitch that is indicative of a present value of the fore/aft trim angle and configured for providing an electrical output in the form of a present trim angle signal indicative of the present fore/aft trim angle of the frame. The depth sensor arrangement may be operatively attached to the implement for indicating a present depth of penetration of at least one tillage tool attached to the frame and be configured for providing an electrical output in the form of a present depth signal indicative of the present depth of penetration of the at least one tillage tool.

A control unit, according to the invention, may be operatively connected to the depth and the trim angle sensor arrangements for respectively receiving the electrical present depth and present trim angle signals from those sensor arrangements. The control unit may also be operatively connected to the trim angle adjustment power source, to provide control of the power source for selectively driving the trim angle adjustment actuator to tilt the frame along the fore/aft axis and thereby change the present fore/aft trim angle of the frame. In some forms of the invention, the control unit being further configured for receiving a desired depth input and controlling the trim angle actuator to provide a desired fore/aft trim angle of the frame corresponding to the desired depth input signal.

In some forms of the invention, the trim angle adjustment actuator may be a hydraulic cylinder, and the trim angle adjustment power source may be an electrically controlled hydraulic power source. In other forms of the invention, the trim angle adjustment actuator may be an electrically driven linear actuator, and the trim angle adjustment power source may be an electrical power source.

In some forms of the invention, the control unit may be configured for receiving an operator input modifying the relationship between the desired fore/aft trim angle of the frame corresponding to the desired depth input signal, and further configured for adjusting the trim angle in accordance with the operator input while the tillage implement is in operation.

A control unit according to the invention may be configured for receiving a signal indicating a present trim angle of the frame and controlling the trim angle actuator to provide a desired fore/aft trim angle of the frame corresponding to the desired depth input signal.

Some forms of the invention may also include a trim angle sensor providing a present trim angle signal indicative of the present trim angle of the frame, and the control unit may be operatively connected to the fore/aft trim angle adjustment actuator and configured for receiving the present trim angle signal and controlling the trim angle adjustment actuator to maintain a desired fore/aft trim angle of the frame.

In various forms of the invention, a control unit may be configured for adjusting the trim angle according to a protocol from the group of protocols consisting of: a) selecting a predetermined trim angle corresponding to the desired depth input and controlling the trim angle actuator power source using the predetermined trim angle; and, b) computing a desired trim angle corresponding to the desired depth input and controlling the trim angle actuator power source using the computed trim angle. In some forms of these protocols, the desired depth input may be an incremental adjustment to a present depth of penetration.

In other various forms of the invention, a control unit may be configured for adjusting the trim angle according to a protocol from the group of protocols consisting of: a) receiving a signal input modifying a relationship between a desired fore/aft trim angle of the frame corresponding to a desired depth input signal, and adjusting the trim angle in accordance with the modifying input while the tillage implement is in operation; b) receiving a signal indicating a present trim angle of the frame and controlling the trim angle adjustment actuator to provide a desired fore/aft trim angle of the frame corresponding to a desired depth of penetration of the tillage implement; c) receiving a desired depth input, selecting a predetermined trim angle corresponding to the desired depth input, and controlling the trim angle adjustment actuator using the predetermined trim angle; d) receiving a desired depth input, computing a desired trim angle corresponding to the desired depth input, and controlling the trim angle adjustment actuator using the computed trim angle; e) receiving an incremental depth change signal and controlling the trim angle adjustment actuator using the incremental depth change signal; f) receiving a signal directing an incremental change to the trim angle and controlling the trim angle adjustment actuator using the incremental trim angle change signal; and g) receiving a present trim angle signal and controlling the trim angle using the present trim angle signal.

The invention may also take the form of a towable implement having a frame, ground support wheels, a hitch, and a fore/aft trim adjustment system according to the invention.

The invention may be practiced as a method for enhancing resolution of a remotely controlled adjustment of a fore/aft trim angle of a frame of a towable tillage implement, by operatively pivotably connecting a hitch to the frame of the implement with a fore/aft trim adjustment system having a fore/aft trim adjustment arrangement including a fore/aft trim angle adjustment actuator, according to the invention.

A method, according to the invention, may further include remotely controlling the stroke of the actuator with a control unit configured for controlling the trim angle according to one or more protocol from the group of protocols consisting of: a) receiving a signal input modifying a relationship between a desired fore/aft trim angle of the frame corresponding to a desired depth input signal, and adjusting the trim angle in accordance with the modifying input while the tillage implement is in operation; b) receiving a signal indicating a present trim angle of the frame and controlling the trim angle adjustment actuator to provide a desired fore/aft trim angle of the frame corresponding to a desired depth of penetration of the tillage implement; c) receiving a desired depth input, selecting a predetermined trim angle corresponding to the desired depth input, and controlling the trim angle adjustment actuator using the predetermined trim angle; d) receiving a desired depth input, computing a desired trim angle corresponding to the desired depth input, and controlling the trim angle adjustment actuator using the computed trim angle; e) receiving an incremental depth change signal and controlling the trim angle adjustment actuator using the incremental depth change signal; f) receiving a signal directing an incremental change to the trim angle and controlling the trim angle adjustment actuator using the incremental trim angle change signal; and g) receiving a present trim angle signal and controlling the trim angle using the present trim angle signal.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
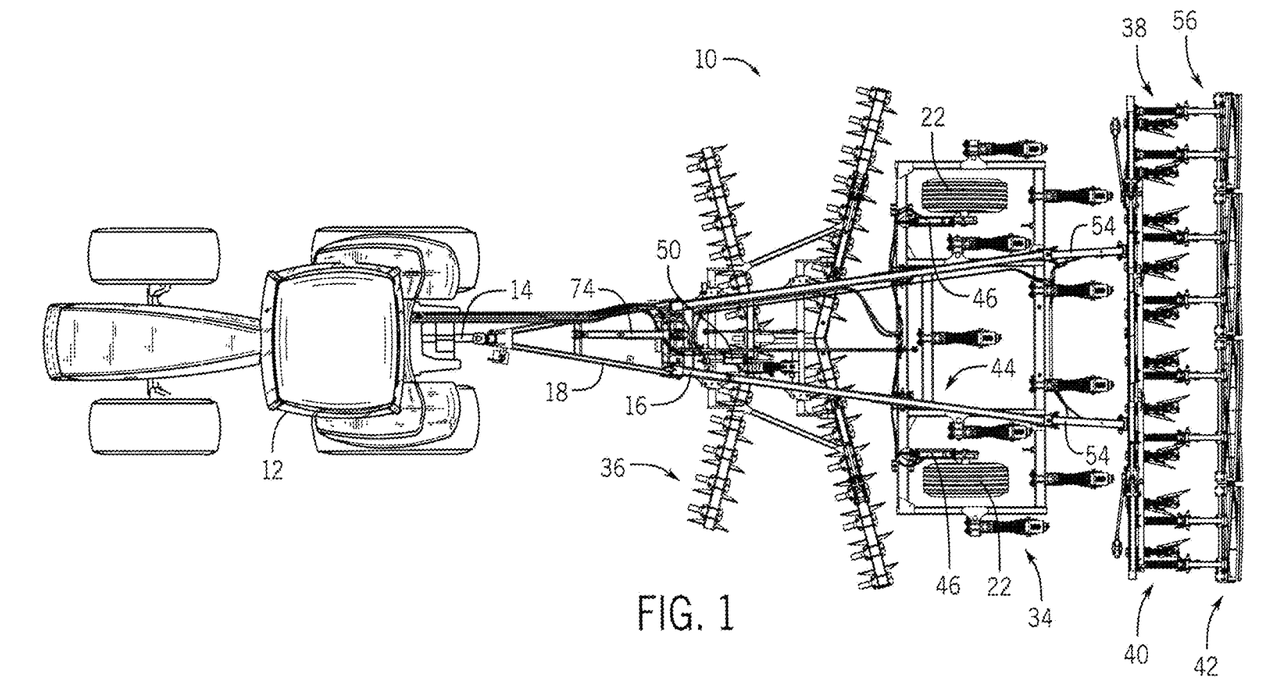
FIG. 1 illustrates a top view of an exemplary embodiment of a combination tillage implement comprising a disk ripper attached to the drawbar of a tractor, in accordance with an exemplary embodiment of the present invention.

FIG. 1 shows an exemplary embodiment of the invention in the form of a towable tillage implement 10 attached to a towing vehicle 12 at a drawbar 14 of the towing vehicle 12. More specifically, FIG. 1 shows an exemplary embodiment of the invention in the form of a combination disk ripper 10, attached to a tractor 12 at the tractor drawbar 14. The exemplary embodiment of the disk ripper 10 incorporates elements of a system, apparatus for adjusting fore/aft trim of a frame 16 of the disk 10, according to an exemplary embodiment of a method for practicing the invention.

Figure 2:
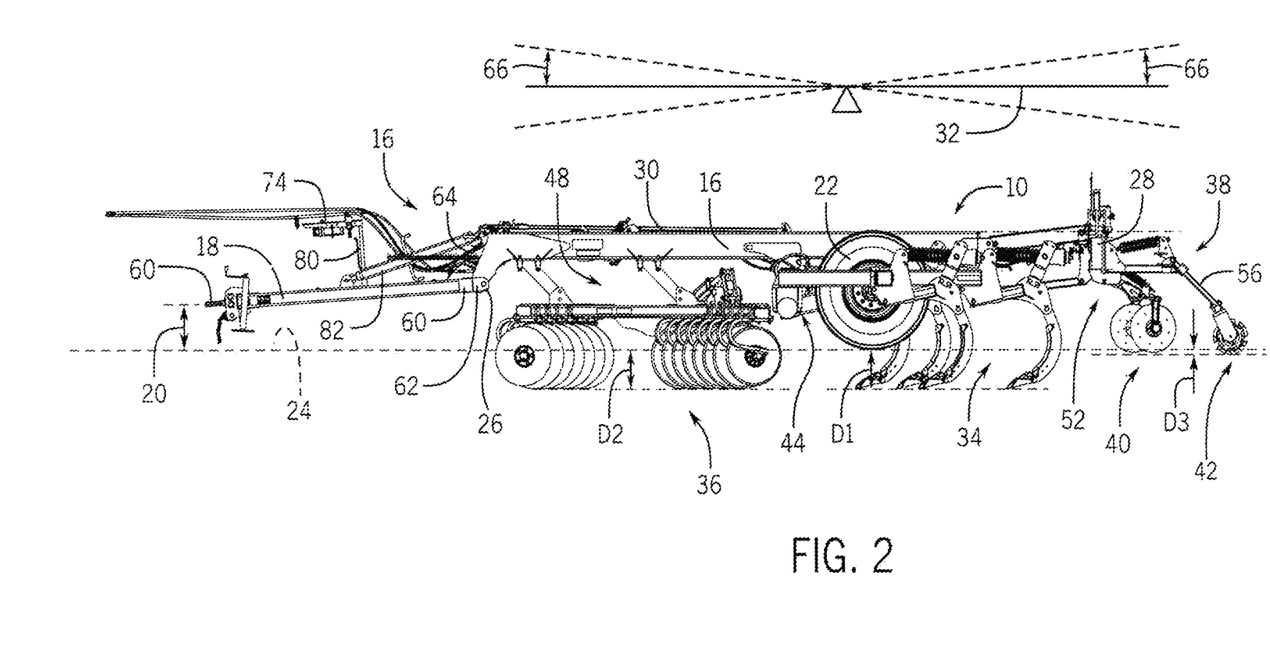
FIG. 2 illustrates an elevation view of the disk ripper of FIG. 1, in accordance with an exemplary embodiment of the present invention.

As shown in FIGS. 1 and 2, the exemplary embodiment of the disk ripper 10 includes the frame 16, a hitch 18 for attaching the disk ripper 10 to the tractor 12 at a hitch height 20, and four ground support wheels 22 for supporting the frame 16 above a ground surface 24.

As shown in FIG. 2, the frame 16 defines forward and aft ends 26,28, an upper surface 30 and a fore/aft axis 32 of the frame 16. In the exemplary embodiment of the disk ripper 10, the fore/aft axis extends along a centerline of the frame 16 and can be considered to be part of a plane defined by the upper surface 30 of the frame 16. In FIG. 2, the fore/aft axis 32 is illustrated offset from the upper surface 30 of the frame 16, for illustrative purposes that will become clear from the description below.

As seen in FIGS. 1 and 2, the frame 16 of the disk ripper 10 is adapted for attachment to the frame 16 of one or more tillage tools. Specifically, the disk ripper 10 is a combination tillage implement carrying an array of shanks terminating at their respective lower ends in ripper points 34, that are preceded by an opening disk arrangement 36 and followed by a finisher 38 having a disk leveler arrangement 40 preceding a finishing reel arrangement 42.

The four ground support wheels 22 are operatively attached to the frame 16 by a walking tandem primary depth adjustment arrangement 44 that includes a pair of depth adjustment actuators, in the form of hydraulic cylinders 46 for primary adjustment of the respective depths of penetration D1,D2,D3 below the ground surface 24 of ripper points 34, the opening disk arrangement 36, and the disk leveler arrangement 40 and the finishing reel arrangement 42 of the finisher 38.

As will be appreciated from the above description and an examination of FIG. 2, in the exemplary embodiment of the disk ripper 10, as the hydraulic cylinders 46 of the primary depth adjustment arrangement 44 are operated in a manner raising the ground support wheels 22 toward the frame 16, the respective depths of penetration D1,D2,D3 below the ground surface 24 of ripper points 34, the opening disk arrangement 36, and the disk leveler arrangement 40 and the finishing reel arrangement 42 of the finisher 38 will all increase by the same distance as the frame 16 is lowered toward the ground surface 24 by the primary depth adjustment arrangement 44. Conversely, as the hydraulic cylinders 46 of the primary depth adjustment arrangement 44 are operated in a manner lowering the ground support wheels 22 away from the frame 16, the respective depths of penetration D1,D2,D3 below the ground surface 24 of ripper points 34, the opening disk arrangement 36, and the disk leveler arrangement 40 and the finishing reel arrangement 42 of the finisher 38 will all decrease by the same distance as the frame 16 is lifted away from the ground surface 24 by the primary depth adjustment arrangement 44.

The primary depth adjustment arrangement 44 and the four ground support wheels 22 are also configured for lifting and supporting the frame 16 and tillage implements 34,36, 40,42 above the ground surface 24 during transport or turning of the disk ripper 10 at the end of a pass across the field.

For proper operation, the ripper points 34, the opening disk arrangement 36, and the disk leveler arrangement 40 and the finishing reel arrangement 42 of the finisher 38 typically need to operate at different penetration distances D1,D2,D3 below the ground surface 24. For example, the ripper points 34 are typically operated at a depth D1 in the range of 8 to 14 inches below the ground surface 24, whereas the disk coulters of the opening disk arrangement 36 are typically operated at considerably shallower depths D2 in the range of 2 to 6 inches below the ground surface 24. The coulters of the leveling disk arrangement 40 typically are operated at an even shallower depth D3 than the coulters of the opening disk arrangement 40, and the finishing reel 42 is typically set to operate essentially at the ground surface 24.

As shown in FIGS. 1 and 2, in the exemplary embodiment of the disk ripper 10 the opening disk arrangement 36 is operatively attached to the frame 16 by an opening disk depth adjustment arrangement 48 that includes a depth adjustment actuator, in the form of a hydraulic cylinder 50 for that provides secondary adjustment of the depth of penetration D2 of the coulters of the opening disk arrangement 36 below the ground surface 24 independently from the ripper points 34 and the finisher arrangement 38.

In similar fashion, the leveling disk arrangement 40 and finishing reel arrangement 42, of the finisher arrangement 38, are operatively attached to the frame 16 by a finisher depth adjustment arrangement 52. The finisher depth adjustment arrangement 52 includes a pair of depth adjustment actuators, in the form of hydraulic cylinders 54 that provide secondary adjustment of the depth of penetration D3 of the coulters of the leveling disk arrangement 40 below the ground surface 24 independently from the ripper points 34 and the opening disk arrangement 36. The finisher arrangement 38 also includes a finishing reel positioning arrangement 56 for alternatively positioning the finishing reel arrangement 42 essentially at the ground surface 24 or raising the finishing reel 42 clear of the ground surface 24 independently from the ripper points 34, the opening disk arrangement 36 and the leveling disk arrangement 40. The finishing reel positioning arrangement 56 of the disk ripper 10 is also configured to allow operation of the finishing reel arrangement 42 in both a float mode, wherein the finishing reels 42 essentially roll along on the ground surface 24, and in a down-pressure mode for applying a down pressure on the finishing reel arrangement 42 to hold it in contact with the ground surface 24.

Figure 3:
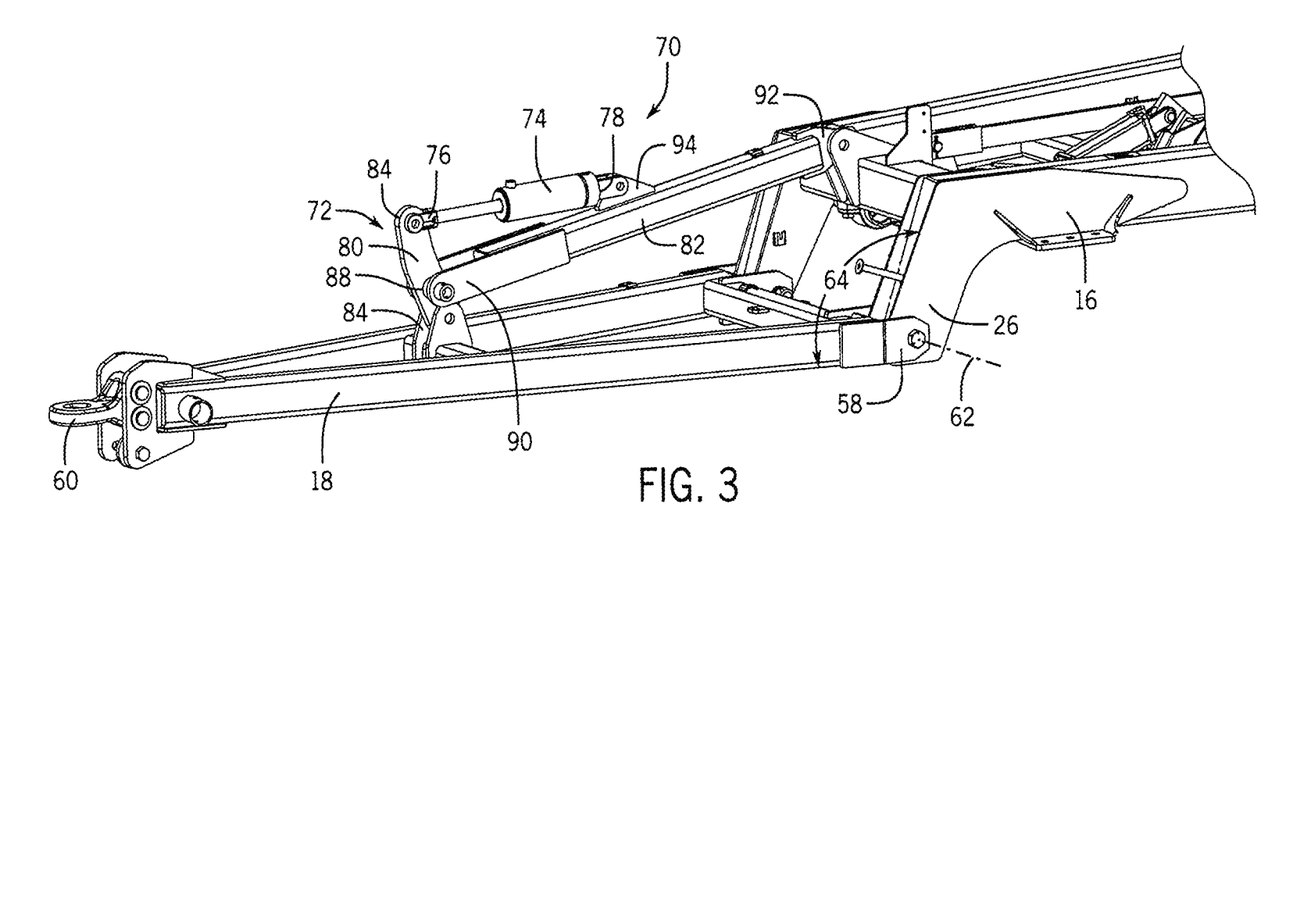
FIG. 3 illustrates an isometric view of a fore/aft trim angle adjustment arrangement, according to the invention, operatively connecting a hitch to a frame of the disk ripper of FIG. 1, in accordance with an exemplary embodiment of the present invention.

As best seen in FIGS. 2 and 3, the hitch 18 has an aft end 58 that is pivotably attached to the forward end 26 of the frame 16. The hitch 18 also has a distal end 60 that is adapted for attachment, at the drawbar height 20, to the towing vehicle 12. The aft end 58 of the hitch is pivotably attached to the frame 16 in a manner that allows the frame 16 to be pivoted about a pivot axis 62, through a pivot angle 64 with respect to the hitch 18, for tilting the front end 26 of the frame 16 upward or downward from a neutral position of the fore/aft axis 32 to thereby adjust the fore/aft trim angle 66 of the frame 16 upward or downward from an initial or present trim angle 66, in the manner illustrated in FIG. 2. An initial value for the pivot and trim angles 64,66 is typically set during an initial calibration of the disk ripper 10, while sitting on a flat ground surface 24. Subsequent adjustment of the trim angle 66, from the initial value set at calibration, may be made as desired to achieve optimal performance of the disk ripper 10, in a manner described in more detail below.

Figure 4:
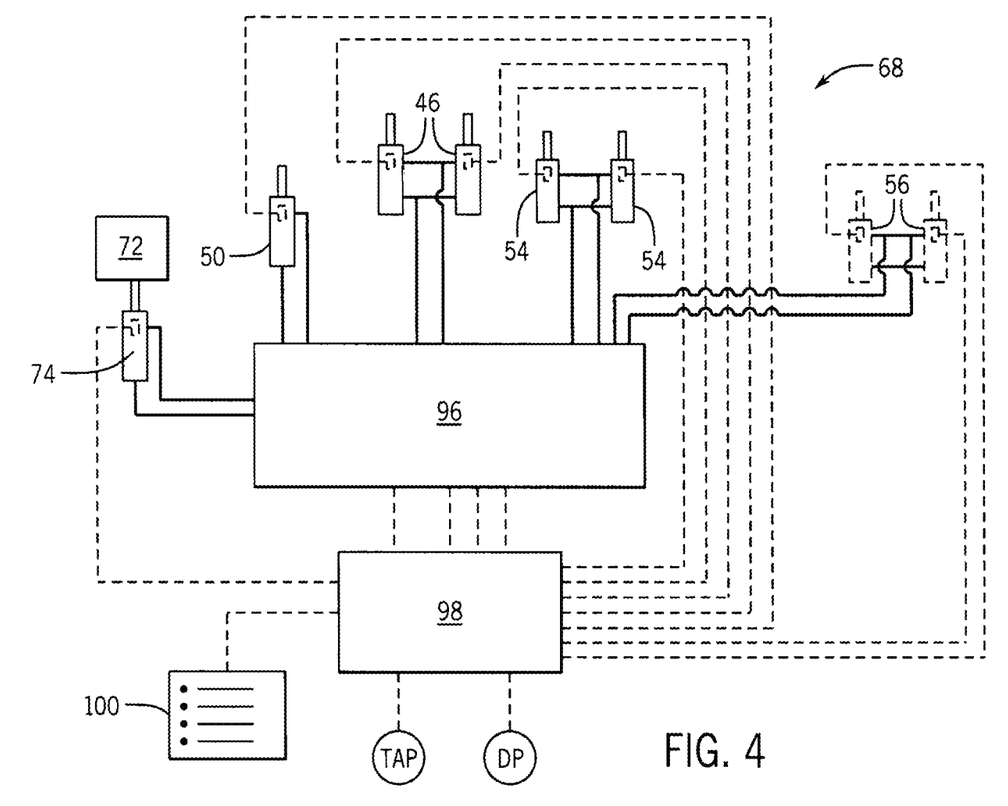
FIG. 4 is a schematic illustration showing interconnections of various elements of a fore/aft trim angle adjustment system, in accordance with an exemplary embodiment of the present invention.

As further illustrated in FIGS. 2-4, the exemplary embodiment of the disk ripper 10 includes a fore/aft trim adjustment system 68, that includes a fore/aft trim angle adjustment arrangement 70 operatively attached between the hitch 18 and the frame 16 for tilting the frame 16 at a trim angle 66 along the fore/aft axis 32. The fore/aft trim angle adjustment arrangement 70 includes an adjustable-length fore/aft trim linkage 72 and remotely controllable fore/aft trim angle adjustment actuator, in the form of a trim angle hydraulic cylinder 74, for adjusting and maintaining the trim angle 66.

The fore/aft trim angle adjustment actuator, in the form of the trim angle adjustment hydraulic cylinder 74 in the exemplary embodiment of the disk ripper 10, has a stroke of approximately eight inches. As will be appreciated from the description below, the fore/aft trim linkage 72 of the fore/aft trim adjustment system 68 in the disk ripper 10 is configured to provide an adjustment in length that is proportionally less than the stroke of the trim angle adjustment cylinder 74, to thereby provide enhanced resolution for remotely controlled adjustment of the trim angle 66 by the fore/aft trim adjustment system 68.

Specifically, in the exemplary embodiment of the disk ripper 10, the fore/aft trim linkage 72 converts the eight-inch stroke of the trim angle adjustment cylinder 74 into a change in total length of about two inches in the fore/aft trim linkage 72, in a manner that allows the fore/aft trim linkage 72 to be proportionately shortened or lengthened one inch from a median length of the fore/aft trim linkage 72. This remotely controllable shortening or lengthening of the fore/aft trim linkage 72 results in a change in the trim angle 66 of about plus or minus three degrees from a median trim position of the frame 16.

As best seen in FIG. 3, the trim angle adjustment hydraulic cylinder 74 is a linear actuator having first and second ends 76,78 separated by an adjustable length defined by the stroke of the trim angle cylinder 74. The fore/aft trim linkage includes a resolution adjusting link 80 and a positioning link 82. The resolution adjusting link 80 has a proximal end 84 defining a first attachment point pivotably attached to the hitch 18 for arcuate motion generally in the fore/aft direction 32, a distal end 86 that is pivotably attached to the first end 76 of the trim angle adjustment cylinder 74, and an intermediate attachment point 88, disposed between the proximal and distal ends 84,86, that is pivotably attached to a first end 90 of the positioning link 82. A second end 92 of the positioning link 82 is pivotably attached to the frame 16. The positioning link 82 further includes a mounting lug 94 for pivotable attachment to the lug 94 of the second end 78 of the trim angle adjustment cylinder 74, in a manner that provides arcuate pivoting motion of the fore/aft resolution adjusting link 80 and the positioning link 82 generally in the fore/aft direction 32 under extension and retraction of the trim angle hydraulic cylinder 74.

It will be appreciated, by those having skill in the art, that the proportional change in length of the fore/aft trim adjustment linkage 72 effected by a change in stroke position of the trim angle cylinder 74 can be selected, in various embodiments of the invention, by changing the position of the intermediate attachment point 88 on the resolution adjusting link 80 relative to the proximal and distal ends 84,86 of the resolution adjusting link 80. In this manner, a longer cylinder stroke can be provided, through practice of the invention, than would be the case if a trim adjustment cylinder were mounted directly between the frame 16 and the hitch 18 in accordance with some prior approaches to providing remote adjustment of the trim angle 66. In such prior direct-acting cylinder approaches, the cylinder stroke was of necessity very short, because only a small change in frame tilt angle 66 is ultimately needed. Such short cylinder strokes make precise control of the stroke, and trim angle 66 difficult, in light of practically attainable limitations of typical control systems. By providing a longer stroke in the trim angle adjustment cylinder 74, for a given desired change in the fore/aft trim angle 66, the present invention allows increased positional resolution that significantly enhances controllability of the trim angle 66.

FIG. 4 is a schematic representation showing the interconnection of various elements of the fore/aft trim angle adjustment system 68 of the exemplary embodiment of the disk ripper 10, to provide remote manual and/or synchronous control of the trim angle 66 of the frame 16 and the respective depths D1,D2,D3 of the ripper points arrangement 34, the opening disk arrangement 36 and the finishing arrangement 38.

As shown in FIG. 4, in addition to the fore/aft trim adjustment linkage 72 described above, the fore/aft trim adjustment system 68 of the exemplary embodiment of the disk ripper 10 includes: the fore/aft trim adjustment hydraulic cylinder 74; the two hydraulic cylinders 46,46 of the primary depth adjustment arrangement 44, which adjust the depth D1 of the ripper points 34; the hydraulic cylinder 50 of the opening disk depth adjustment arrangement 48, that independently adjusts the depth D2 of the opening disk arrangement 36; the hydraulic cylinders 54,54 of the finisher depth adjustment arrangement 52, that independently adjust the depth of penetration D3 of the coulters of the leveling disk arrangement 40; and, the finishing reel positioning arrangement 56 (illustrated as hydraulic cylinders 56,56 in FIG. 4) that independently adjusts the position of the finishing reel 42.

As further shown in FIG. 4, the fore/aft trim adjustment system 68 of the exemplary embodiment of the disk ripper 10 also includes a controllable hydraulic power source 96, a control unit 98, and a cab-mounted operator information and control monitor in the form of a touch screen 100. The hydraulic power source 96 is illustrated in FIG. 4 as serving all of the hydraulic cylinders 46,46,50,54,54,56,56,74, but may be comprised of several hydraulic power and control units located on the implement and/or the towing vehicle in various embodiments of the invention. For example, in some embodiments the source of hydraulic power 96 may include one or more hydraulic pumps and a reservoir for the hydraulic fluid located in the towing vehicle 12, and a manifold or directional control valve arrangement to independently meter flow to each of the hydraulic cylinders 46,46,50,54, 54,56,56,74. The manifold or directional control valve arrangement may be located in the towing vehicle 12, or may be partly located in the towing vehicle 12 and partly on the implement 10.

As indicated by dashed lines in FIG. 4, each of the hydraulic cylinders 46,46,50,54,54,56,56,74 in the exemplary embodiment is equipped with internal sensors that provide an electrical signal to the control unit 98 that is indicative of the present extension of that respective one of the hydraulic cylinders 46,46,50,54,54,56,56,74. From these present extension signals, the control unit 98 can determine the present depths D1,D2,D3 of the disk ripper, the opening disk arrangement 36, the finishing disk arrangement 40, and the position of the finishing reel 42.

Alternatively, or additionally, as further indicated in FIG. 4, the fore/aft trim adjustment system 68 of the exemplary embodiment of the disk ripper 10 may include a dedicated present depth sensing arrangement, using LASER, RADAR, LiDAR, ultrasonic or other appropriate sensors, for example, that directly measure and provide a present depth signal DP to the control unit 98. In similar fashion, the fore/aft trim adjustment system 68 of the exemplary embodiment of the disk ripper 10 may include a dedicated trim angle sensing arrangement, using rotary potentiometer for directly measuring the pivot angle 64, or a trim sensing arrangement incorporating an inclinometer, LASER, RADAR, LiDAR, GNSS or ultrasonic sensors, for example, to directly measure the present trim angle 66 with respect to the ground surface 24 and provide a present trim angle signal TAP to the control unit 98.

Prior to operation of the disk ripper 10, a calibration of the various elements of the fore/aft trim adjustment system 68 is performed to establish a baseline relationship for the positions of the various hydraulic cylinders 46,46,50,54,54,56, 56,74. Typically, such a calibration is performed on a flat ground surface 24, such as a shop floor or equipment lot, with the distal end 60 of the hitch 18 of the disk ripper 10 attached to the drawbar 14 of the tractor 12 at the drawbar hitch height 20.

During calibration of the exemplary embodiment of the disk ripper 10, the primary depth adjustment arrangement 44 is adjusted so that the ripper points 34 are just contacting the ground surface 24. The opening disk depth adjustment arrangement 48, the finisher depth adjustment arrangement 52, and the finishing reel positioning arrangement 56 are all operated to lift the coulters of the opening disk arrangement 36, the coulters of the finishing disk arrangement 40, and the finishing reel arrangement 42 free from contact with the ground surface 24. The fore/aft trim angle 66 is adjusted so that the frame 16 is substantially parallel to the ground surface 24. With the disk ripper 10 in the calibration position on the flat ground surface, the positions of depth and trim angle adjusting hydraulic cylinders 46,46, 74 as reported by their respective internal position sensors, and/or the information DP,TAP provided by any other present depth or present trim angle sensing arrangements are recorded by the control unit 98 and selected as the baseline relative position of various elements of the disk ripper 10.

Baseline depth positions for the opening disk arrangement 36, the finishing disk arrangement 40, and the finishing reel arrangement 42, with respect to the frame 16, the ripper points 34 and/or any other desired point or plane of reference may also be established during calibration by operating the opening disk depth adjustment arrangement 48, the finisher depth adjustment arrangement 52, and the finishing reel positioning arrangement 56 to lower the coulters of the opening disk arrangement 36, the coulters of the finishing disk arrangement 40, and the finishing reel arrangement 42 into contact with the ground surface 24, and recording the positions of the hydraulic cylinders 50,54,54,56,56 in the opening disk depth adjustment arrangement 48, the finisher depth adjustment arrangement 52, and the finishing reel positioning arrangement 56 as reported by their respective internal position sensors, and/or the information provided by any other applicable sensing arrangements, and recording and selecting such sensed information in the control unit 98 as the baseline position relative to one or more elements of the disk ripper 10.

Baseline depth positions for the opening disk arrangement 36, the finishing disk arrangement 40, and the finishing reel arrangement 42, with respect to the frame 16 or other point or plane of reference may also be established in secondary calibration procedures, following calibration and selection of a baseline for the depth and trim angles DP,TAP in the manner described above.

The baselines may be modified while the exemplary embodiment of the disk ripper 10 is in the field, either standing still or while in operation. This may be desirable to optimize performance, or be necessitated by differing soil conditions, crop residue type and amount, and under conditions where the balance of the disk ripper 10 may be altered depending on whether the finishing reel 42 is being operated in its raised, float or down pressured mode. The control unit 98 of the exemplary embodiment may also be configured so that it can readily be returned to the baseline at a later date, or so that the modified baseline may be selectively set as a new baseline.

Once a given baseline is established, the control unit 98 may remotely adjust the various elements of the disk ripper 10 to achieve a desired operating condition. In some operating modes, the control unit 98 may be used for remotely and precisely setting and controlling the fore/aft trim angle 66, via inputs from the operator in the cab of the tractor 12, via the touch screen 100 or other cab-mounted controls. In other synchronous operating modes, the control unit 98 may control two or more of the various elements of the disk ripper 10 as a function of one of the depths of penetration D1,D2,D3, or as a function of the trim angle 66, in such a manner that changing an operating parameter of one element of the disk ripper 10 automatically will cause the control unit 98 to make a corresponding adjustment to an operating parameter of another element of the disk ripper 10.

For example, in some embodiments of the invention, when the control unit 98 is given a desired depth input for one of the tillage implements 34,36,38 during a synchronous operating mode, the control unit 98 may be configured for adjusting the trim angle 66 according to a protocol such as: a) selecting a predetermined trim angle 66 corresponding to the desired depth input from a data set stored in the control unit 98 and controlling the trim angle actuator power source 44 using the selected predetermined trim angle; or, b) computing a desired trim angle 66 corresponding to the desired depth input and controlling the trim angle actuator power source 44 using the computed trim angle. In some forms of these protocols, the desired depth input may be an incremental adjustment to a present depth of penetration.

Alternatively, or additionally, when the control unit 98 receives a desired depth input and/or a desired trim angle input, the control unit 98 operating in a synchronous mode may be configured for adjusting the trim angle 66 according to a protocol such as: a) receiving a signal input modifying a baseline or present relationship between a desired fore/aft trim angle 66 of the frame 16 corresponding to a desired depth input signal, and adjusting the trim angle 66 in accordance with the modifying input while the tillage implement 10 is in operation; b) receiving a signal indicating a present trim angle 66 of the frame 16 and controlling the trim angle adjustment actuator 74 to provide a desired fore/aft trim angle 66 of the frame 16 corresponding to a desired depth of penetration D1,D2,D3 of the tillage implement 10; c) receiving a desired depth input, selecting a predetermined trim angle 66 corresponding to the desired depth input from a data set stored in the control unit 98, and controlling the trim angle adjustment actuator 74 using the selected predetermined trim angle 66; d) receiving a desired depth input, computing a desired trim angle 66 corresponding to the desired depth input, and controlling the trim angle adjustment actuator 74 using the computed trim angle 66; e) receiving an incremental depth change signal and controlling the trim angle adjustment actuator 74 using the incremental depth change signal; f) receiving a signal directing an incremental change to the trim angle 66 and controlling the trim angle adjustment actuator 74 using the incremental trim angle change signal; and/or, g) receiving a present trim angle signal TAP and controlling the trim angle 66 using the present trim angle signal TAP.

In any of these or other operating modes and/or protocols of the invention, those having skill in the art will appreciate that the enhanced resolution of fore/aft trim adjustment afforded by practice of the invention provides significant advantages in precision and practical implementation of a remotely operable fore/aft trim adjustment capability in a control system, a method, or in a tillage implement that is sensitive to the fore/aft trim angle of the frame of the implement.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is also to be understood that this invention is not limited to the particular embodiments described herein but is intended to include all changes and modifications that are within the scope and spirit of the invention.

What is claimed is:

1. A system for adjusting fore/aft trim in a towed implement having a frame, ground support wheels and a hitch, the frame defining forward and aft ends and a fore/aft axis thereof and adapted for attachment to the frame of one or more tillage tools, the ground support wheels being operatively attached to the frame by a depth adjustment arrangement that includes a depth adjustment actuator for adjusting a depth of penetration of at least one of the one or more tillage tools below a ground surface, and the hitch having an aft end thereof pivotably attached to the forward end of the frame and a distal end thereof adapted for attachment at a drawbar height to a towing vehicle, with the aft end of the hitch being pivotably attached to the frame in a manner allowing the frame to be pivoted through a pivot angle with respect to the hitch for tilting the frame along the fore/aft axis to thereby adjust fore/aft trim of the frame, the fore/aft trim adjustment system comprising:

a fore/aft trim angle adjustment arrangement operatively attached between the hitch and the frame for tilting the frame at a trim angle along the fore/aft axis;

the fore/aft trim angle adjustment arrangement having an adjustable-length fore/aft trim linkage operatively connected between the frame and the hitch for adjusting and maintaining the trim angle;

the fore/aft trim angle adjustment arrangement also having a remotely controllable fore/aft trim angle adjustment actuator having a stroke and operatively attached to the fore/aft trim angle adjustment linkage for remotely controlling the length of the fore/aft trim angle adjustment linkage to thereby adjust the trim angle;

the fore/aft trim linkage being configured to provide an adjustment in length that is proportionally less than the stroke of the fore/aft trim angle adjustment actuator, to thereby provide enhanced resolution for remotely controlled adjustment of the trim angle by the fore/aft trim adjustment system;

wherein:
the fore/aft trim angle adjustment actuator is a linear actuator having first and second ends separated by an adjustable length of the linear actuator; and
the fore/aft trim adjustment arrangement includes a resolution adjusting link and a positioning link;

the resolution adjusting link having a proximal end defining a first attachment point pivotably attached to the hitch for motion in the fore/aft direction, a distal end pivotably attached to the first end of the linear actuator, and an intermediate attachment point pivotably attached to a first end of the positioning link; and the positioning link further having a second end pivotably attached to the frame, and a mounting lug for pivotable attachment of the second end of the linear actuator in a manner that provides pivoting motion of the fore/aft resolution adjusting link and the positioning link generally in the fore/aft direction under extension and retraction of the length of the linear actuator.

2. The fore/aft trim adjustment system of claim 1, further including:

a trim angle sensor providing a present trim angle signal indicative of the present trim angle of the frame; and a control unit operatively connected to the fore/aft trim angle adjustment actuator and configured for receiving the present trim angle signal and controlling the trim angle adjustment actuator to maintain a desired fore/aft trim angle of the frame.

3. The fore/aft trim adjustment system of claim 2, wherein:

the fore/aft trim angle adjustment actuator is a linear actuator having first and second ends separated by an adjustable length of the linear actuator; and the fore/aft trim adjustment arrangement includes a resolution adjusting link and a positioning link;

the resolution adjusting link having a proximal end defining a first attachment point pivotably attached to the hitch for motion in the fore/aft direction, a distal end pivotably attached to the first end of the linear actuator, and an intermediate attachment point pivotably attached to a first end of the positioning link;

the positioning link further having a second end pivotably attached to the frame, and a mounting lug for pivotable attachment of the second end of the linear actuator in a manner that provides pivoting motion of the fore/aft resolution adjusting link and the positioning link generally in the fore/aft direction under extension and retraction of the length of the linear actuator.

4. The fore/aft trim adjustment system of claim 1, further including:

a trim angle adjustment power source operatively connected to the trim angle adjustment actuator;

a trim angle position sensor arrangement operatively attached between the hitch and the frame for detecting a present value of the pivot angle between the frame and the hitch that is indicative of a present value of the fore/aft trim angle, and providing an electrical output in the form of a present trim angle signal indicative of the present fore/aft trim angle of the frame;

a depth sensor arrangement operatively attached to the implement for indicating a present depth of penetration of at least one tillage tool attached to the frame, and providing an electrical output in the form of a present depth signal indicative of the present depth of penetration of the at least one tillage tool; and a control unit operatively connected to the depth and the trim angle sensor arrangements for respectively receiving the electrical present depth and present trim angle signals therefrom;

the control unit also being operatively connected to the trim angle adjustment power source to provide control thereof for selectively driving the trim angle adjustment actuator to tilt the frame along the fore/aft axis to thereby change the present fore/aft trim angle of the frame;

the control unit being further configured for receiving a desired depth input and controlling the trim angle actuator to provide a desired fore/aft trim angle of the frame corresponding to the desired depth input signal.

5. The fore/aft trim adjustment system of claim 4, wherein the trim angle adjustment actuator is a hydraulic cylinder, and the trim angle adjustment power source is an electrically controlled hydraulic power source.

6. The fore/aft trim adjustment system of claim 4, wherein the trim angle adjustment actuator is an electrically driven linear actuator, and the trim angle adjustment power source is an electrical power source.

7. The fore/aft trim adjustment system of claim 4, wherein the control unit is configured for adjusting the trim angle according to a protocol from the group of protocols consisting of:

receiving a signal input modifying a relationship between a desired fore/aft trim angle of the frame corresponding to a desired depth input signal, and adjusting the trim angle in accordance with the modifying input while the tillage implement is in operation;

receiving a signal indicating a present trim angle of the frame and controlling the trim angle adjustment actuator to provide a desired fore/aft trim angle of the frame corresponding to a desired depth of penetration of the tillage implement;

receiving a desired depth input, selecting a predetermined trim angle corresponding to the desired depth input, and controlling the trim angle adjustment actuator using the predetermined trim angle;

receiving a desired depth input, computing a desired trim angle corresponding to the desired depth input, and controlling the trim angle adjustment actuator using the computed trim angle;

receiving an incremental depth change signal and controlling the trim angle adjustment actuator using the incremental depth change signal; and receiving a signal directing an incremental change to the trim angle and controlling the trim angle adjustment actuator using the incremental trim angle change signal.

8. The fore/aft trim adjustment system of claim 7, wherein:

the fore/aft trim adjustment system further includes a trim angle sensor operatively connected to the control unit and configured for providing a present trim angle signal indicative of the present trim angle of the frame; and the control unit is further configured for receiving the present trim angle signal and controlling the trim angle using the present trim angle signal.

9. A towable implement having a frame, ground support wheels, a hitch, and a fore/aft trim adjustment system, the frame defining forward and aft ends and a fore/aft axis thereof and being adapted for attachment of one or more tillage tools, the ground support wheels being operatively attached to the frame by a depth adjustment arrangement that includes a depth adjustment actuator for adjusting a depth of penetration of at least one of the one or more tillage tools below a ground surface, and the hitch having an aft end thereof pivotably attached to the forward end of the frame and a distal end thereof adapted for attachment at a drawbar height to a towing vehicle, the aft end of the hitch being pivotably attached to the frame in a manner allowing the frame to be pivoted through a pivot angle with respect to the hitch for tilting the frame along the fore/aft axis to thereby adjust fore/aft trim of the frame, the fore/aft adjustment system comprising:

a fore/aft trim angle adjustment arrangement operatively attached between the hitch and the frame for tilting the frame at a trim angle along the fore/aft axis;

the fore/aft trim angle adjustment arrangement having an adjustable-length fore/aft trim linkage operatively connected between the frame and the hitch for adjusting and maintaining the trim angle;

the fore/aft trim angle adjustment arrangement also having a remotely controllable fore/aft trim angle adjustment actuator having a stroke and operatively attached to the fore/aft trim angle adjustment linkage for remotely controlling the length of the fore/aft trim angle adjustment linkage to thereby adjust the trim angle;

the fore/aft trim linkage being configured to provide an adjustment in length that is proportionally less than the stroke of the fore/aft trim angle adjustment actuator, to thereby provide enhanced resolution for remotely controlled adjustment of the trim angle by the fore/aft trim adjustment system, wherein:

the fore/aft trim adjustment actuator is a linear actuator having first and second ends separated by an adjustable length of the linear actuator;

the fore/aft trim adjustment arrangement includes a resolution adjusting link and a positioning link;

the resolution adjusting link having a proximal end defining a first attachment point pivotably attached to the hitch for motion in the fore/aft direction, a distal end pivotably attached to the first end of the linear actuator, and an intermediate attachment point pivotably attached to a first end of the positioning link; and the positioning link further having a second end pivotably attached to the frame, and a mounting lug for pivotable attachment of the second end of the linear actuator in a manner that provides pivoting motion of the fore/aft resolution adjusting link and the positioning link generally in the fore/aft direction under extension and retraction of the length of the linear actuator.

10. The towable implement of claim 9, wherein the fore/aft trim adjustment system further includes:

a trim angle adjustment power source operatively connected to the trim angle adjustment actuator;

a trim angle position sensor arrangement operatively attached between the hitch and the frame for detecting a present value of the pivot angle between the frame and the hitch that is indicative of a present value of the fore/aft trim angle, and providing an electrical output in the form of a present trim angle signal indicative of the present fore/aft trim angle of the frame;

a depth sensor arrangement operatively attached to the implement for indicating a present depth of penetration of at least one tillage tool attached to the frame, and providing an electrical output in the form of a present depth signal indicative of the present depth of penetration of the at least one tillage tool; and a control unit operatively connected to the depth and the trim angle sensor arrangements for respectively receiving the electrical present depth and present trim angle signals therefrom;

the control unit also being operatively connected to the trim angle adjustment power source to provide control thereof for selectively driving the trim angle adjustment actuator to tilt the frame along the fore/aft axis to thereby change the present fore/aft trim angle of the frame;

the control unit being further configured for receiving a desired depth input and controlling the trim angle actuator to provide a desired fore/aft trim angle of the frame corresponding to the desired depth input signal.

11. The towable implement of claim 9, wherein the trim angle adjustment actuator is a hydraulic cylinder, and the trim angle adjustment power source is an electrically controlled hydraulic power source.

12. The towable implement of claim 9, wherein the trim angle adjustment actuator is an electrically driven linear actuator, and the trim angle adjustment power source is an electrical power source.

13. The towable implement of claim 9, wherein the control unit is configured for receiving an operator input modifying the relationship between the desired fore/aft trim angle of the frame corresponding to the desired depth input signal and adjusting the trim angle in accordance with the operator input while the tillage implement is in operation.

14. The towable implement of claim 9, wherein the control unit is further configured for receiving a signal indicating a present trim angle of the frame and controlling the trim angle adjustment actuator to provide a desired fore/aft trim angle of the frame corresponding to the desired depth input signal.

15. The towable implement of claim 9, wherein the control unit is configured for adjusting the trim angle according to a protocol from the group of protocols consisting of:

selecting a predetermined trim angle corresponding to the desired depth input and controlling the trim angle actuator power source using the predetermined trim angle;

computing a desired trim angle corresponding to the desired depth input and controlling the trim angle actuator power source using the computed trim angle.

16. The towable implement of claim 15, wherein the desired depth input is an incremental adjustment to a present depth of penetration.

17. A method for enhancing resolution of a remotely controlled adjustment of a fore/aft trim angle of a frame of a towable tillage implement by operatively pivotably connecting a hitch to the frame of the implement with a fore/aft trim adjustment system having a fore/aft trim angle adjustment arrangement operatively attached between the hitch and the frame for tilting the frame at a desired trim angle along a fore/aft axis, wherein the fore/aft trim angle adjustment arrangement includes:

an adjustable-length fore/aft trim linkage operatively connected between the frame and the hitch for adjusting and maintaining the trim angle; and a remotely controllable fore/aft trim angle adjustment actuator operatively attached to the fore/aft trim angle linkage and having a stroke for remotely controlling the length of the fore/aft trim angle linkage to thereby adjust the trim angle as a function of the stroke of the actuator;

with the fore/aft trim linkage being configured for providing an adjustment in length that is proportionally less than the stroke of the fore/aft trim angle adjustment actuator, to thereby provide enhanced resolution for remotely controlled adjustment of the trim angle by the fore/aft trim adjustment system, and the method further comprises:
remotely controlling the stroke of the actuator with a control unit configured for controlling the trim angle according to one or more protocol from the group of protocols consisting of:
receiving a signal input modifying a relationship between a desired fore/aft trim angle of the frame corresponding to a desired depth input signal, and adjusting the trim angle in accordance with the modifying input while the tillage implement is in operation;
receiving a signal indicating a present trim angle of the frame and controlling the trim angle adjustment actuator to provide a desired fore/aft trim angle of the frame corresponding to a desired depth of penetration of the tillage implement;
receiving a desired depth input, selecting a predetermined trim angle corresponding to the desired depth input, and controlling the trim angle adjustment actuator using the predetermined trim angle;
receiving a desired depth input, computing a desired trim angle corresponding to the desired depth input, and controlling the trim angle adjustment actuator using the computed trim angle;
receiving an incremental depth change signal and controlling the trim angle adjustment actuator using the incremental depth change signal;
receiving a signal directing an incremental change to the trim angle and controlling the trim angle adjustment actuator using the incremental trim angle change signal; and
receiving a present trim angle signal and controlling the trim angle using the present trim angle signal.

* * * * *